United States Patent
Chi et al.

(10) Patent No.: US 7,142,938 B2
(45) Date of Patent: Nov. 28, 2006

(54) MANUFACTURING MANAGEMENT SYSTEM AND METHOD

(75) Inventors: Shiaw-Lin Chi, Hsinchu (TW); Kun-Chi Liu, Chiayi (TW); Chien-Wei Wang, Hsinchu (TW); Chih-Chien Chang, Jhuangwei Township, Yilan County (TW); Chang-Hsi Lin, Taipei Hsien (TW); Chien-Fei Cheng, Hsintien (TW); Lieh-Jung Chen, Tainan (TW); Fang-Ni Wu, Kaohsiung (TW); Birgie Kuo, Yungkang (TW); Yi-Fang Su, Tainan (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 98 days.

(21) Appl. No.: 10/963,870

(22) Filed: Oct. 13, 2004

(65) Prior Publication Data

US 2006/0079978 A1 Apr. 13, 2006

(51) Int. Cl.
*G06F 19/00* (2006.01)

(52) U.S. Cl. .................... 700/106; 700/107
(58) Field of Classification Search ............... 700/106, 700/107, 112; 705/22, 28
See application file for complete search history.

(56) References Cited

U.S. PATENT DOCUMENTS

| | | | | |
|---|---|---|---|---|
| 6,128,588 A | * | 10/2000 | Chacon | 703/6 |
| 6,240,335 B1 | * | 5/2001 | Wehrung et al. | 700/230 |
| 6,317,643 B1 | * | 11/2001 | Dmochowski | 700/121 |
| 6,317,725 B1 | * | 11/2001 | Muraoka | 705/28 |
| 6,345,208 B1 | * | 2/2002 | Yoshiyuki | 700/97 |
| 6,345,259 B1 | * | 2/2002 | Sandoval | 705/7 |
| 6,477,432 B1 | * | 11/2002 | Chen et al. | 700/51 |
| 6,647,316 B1 | * | 11/2003 | Bahri et al. | 700/217 |
| 6,662,076 B1 | * | 12/2003 | Conboy et al. | 700/214 |
| 6,705,523 B1 | * | 3/2004 | Stamm et al. | 235/385 |
| 6,889,178 B1 | * | 5/2005 | Chacon | 703/6 |
| 6,976,033 B1 | * | 12/2005 | Yang et al. | 707/104.1 |
| 2003/0083947 A1 | * | 5/2003 | Hoffman et al. | 705/22 |
| 2003/0200130 A1 | * | 10/2003 | Kall et al. | 705/8 |
| 2004/0158339 A1 | * | 8/2004 | Kawase et al. | 700/97 |
| 2005/0187649 A1 | * | 8/2005 | Funk et al. | 700/121 |

* cited by examiner

*Primary Examiner*—Michael D. Masinick
(74) *Attorney, Agent, or Firm*—Thomas, Kayden, Horstemeyer & Risley (57) ABSTRACT

A manufacturing management system and method. The system includes a manufacturing execution system and a plurality of manufacturing sites coupled to the manufacturing execution system. The manufacturing execution system comprises management data to support the manufacturing sites. Each manufacturing site comprises a corresponding site attribute. At least one of the manufacturing sites receives a lot, queries the management data for the lot from the manufacturing execution system according to lot identification and the site attribute of the manufacturing site receiving the lot, and processes the lot accordingly.

14 Claims, 7 Drawing Sheets

MANUFACTURING MANAGEMENT SYSTEM AND METHOD

BACKGROUND

The invention relates to manufacturing management, and particularly to a manufacturing management system and method using a single MES (Manufacturing Execution System) to support multiple manufacturing sites.

Figure 1:
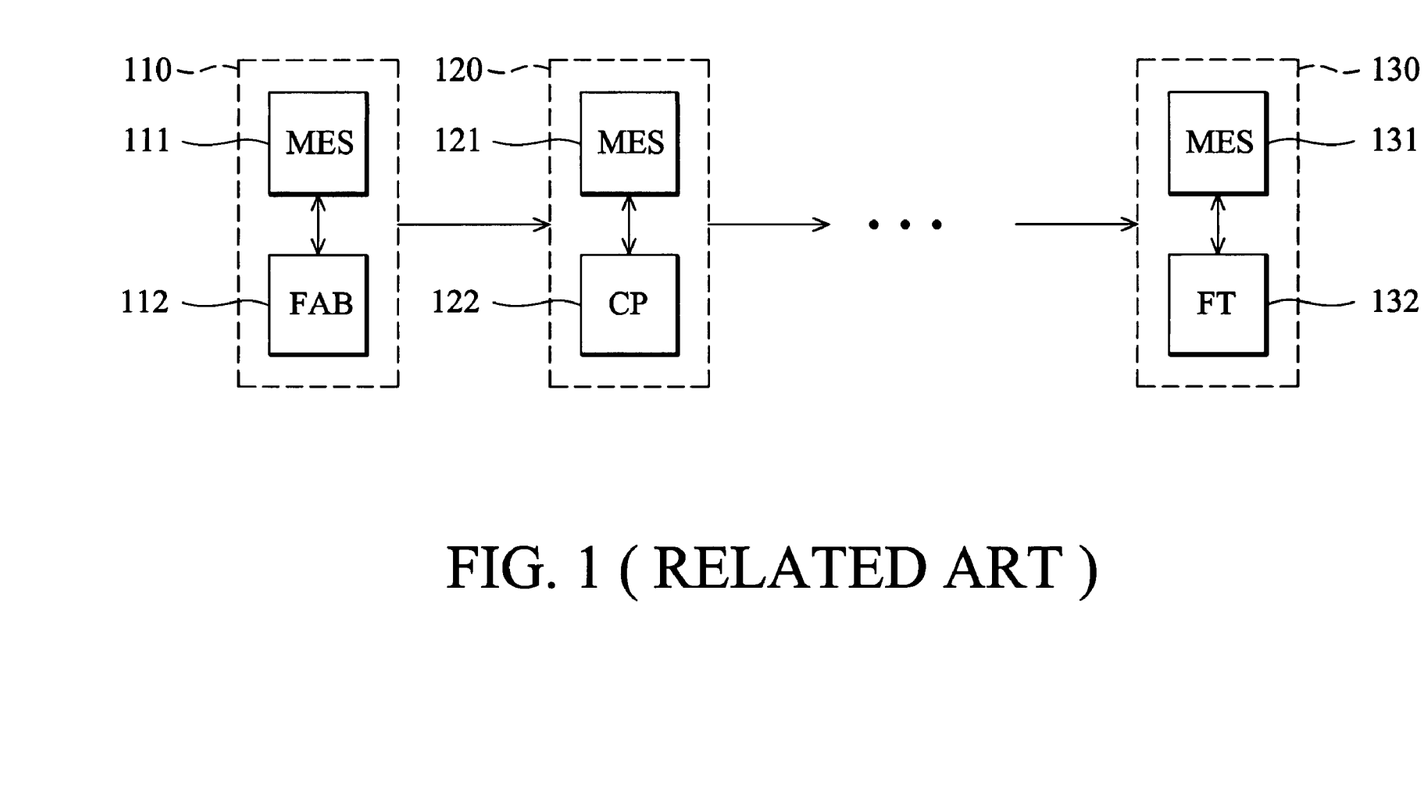
FIG. 1 is a schematic diagram illustrating a conventional manufacturing environment.

In semiconductor manufacturing, several manufacturing phases including FAB (Fabrication), CP (Circuit Probe), BP (Bumping), CF (Color Filter), ASM (Assembly), FT (Final Test), and others are required for entire manufacturing. Additionally, several manufacturing sites may be provided for each manufacturing phase. Conventionally, each manufacturing site is controlled by one MES. FIG. 1 is a schematic diagram illustrating a conventional manufacturing environment. In this case, the manufacturing site FAB 112 in manufacturing phase FAB 110 is controlled by MES 111, CP 122 in manufacturing phase CP 120 is controlled by MES 121, and FT 130 in manufacturing phase FT 130 is controlled by MES 131. One wafer may go through several manufacturing phases to become final products. After a lot is completed at manufacturing site FAB 112, the lot information is transmitted from MES 111 and created in MES 121.

Figure 2:
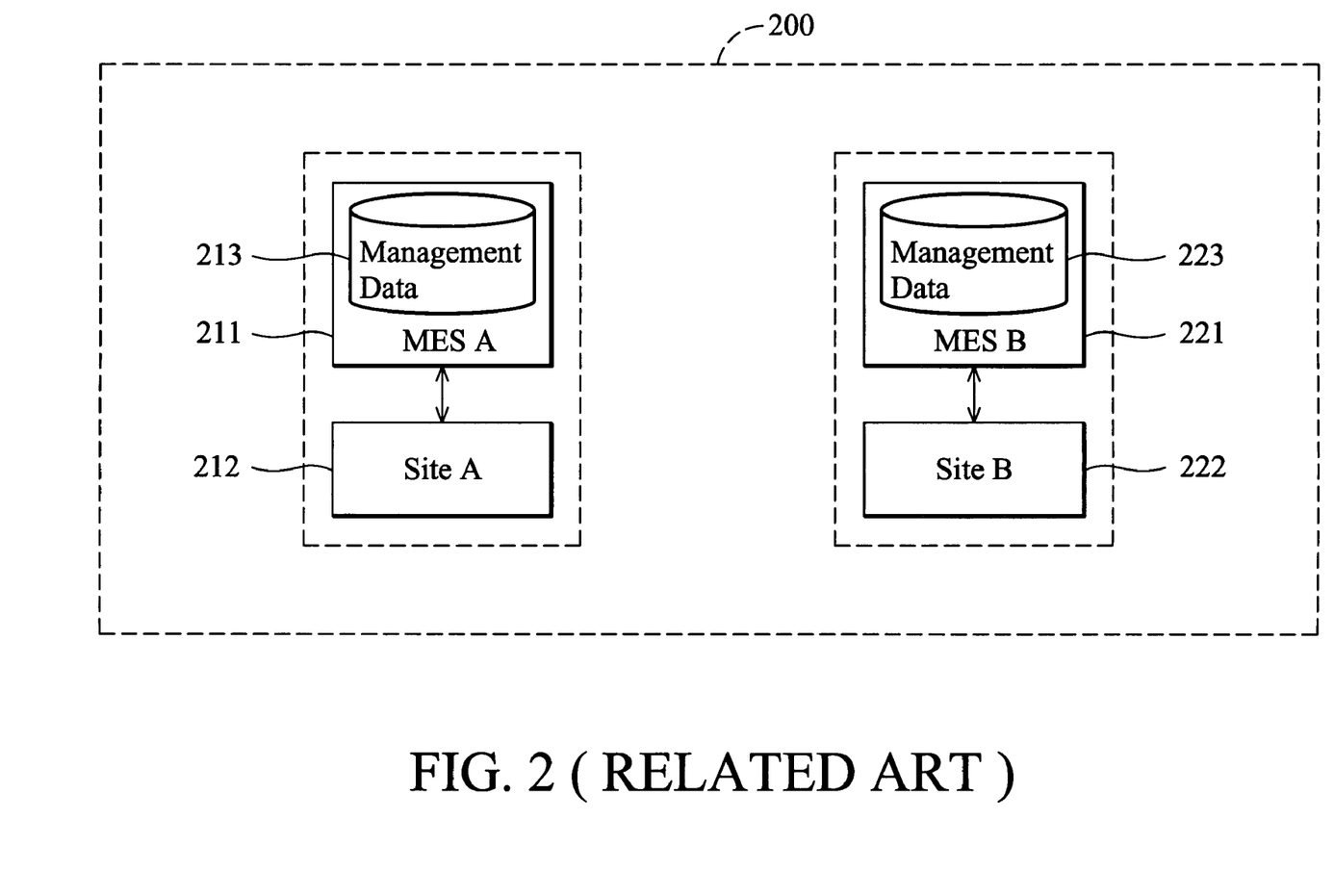
FIG. 2 is a schematic diagram illustrating duplicated management data in different MESs.

Additionally, each MES has one copy of management data, such as a base record or product information comprising route, user authorization, lot information and others, with a manufacturing site processing lots accordingly. For example, in a conventional manufacturing environment 200 of FIG. 2, a MES A 211 comprises management data 213 and a manufacturing site A 212 processing lots accordingly, and a MES B 221 comprises management data 223 and a manufacturing site B 222 processing lots accordingly. The management data, however, such as product information in the MES A 211 and MES B 221 is similar. The data consistency is not easily maintained if one copy is updated. Further, since an IC foundry may include a plurality of manufacturing sites, and one host machine, one MES instance/license, one set of maintenance manpower is required for each site, thus, the related deployment and cost is time-consuming and expensive.

Figure 3:
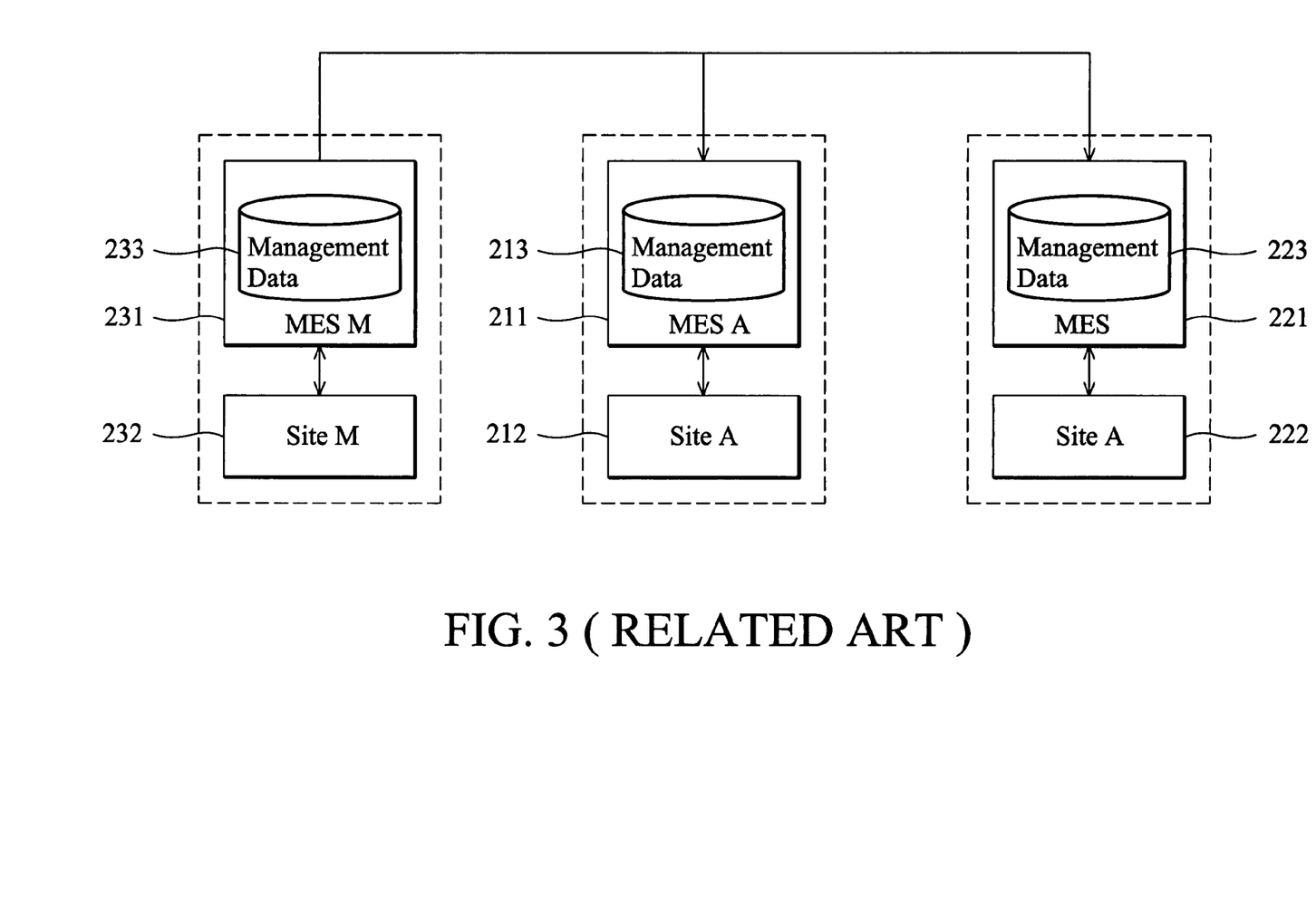
FIG. 3 is a schematic diagram illustrating another conventional manufacturing management system ensuring data consistency.

Another mechanism is provided to solve the data consistency issue. In FIG. 3, a master MES M 231 controlling a manufacturing site M 232 centrally manages management data 233. Once the management data 233 is updated, the updated management data is transferred to the MES A 211 and MES B 221 to update the original management data. The improved mechanism, however, only ensures the data consistency between different MES'. The cost for multiple MESs and related maintenance manpower are still issues to be overcome.

SUMMARY

Embodiments of the invention are thus provided to address the aforementioned issues. Embodiments of the invention are applicable to any factory, service supplier, and/or product.

Embodiments of the invention provide a manufacturing management system and method using a single MES to support multiple manufacturing sites. According to an embodiment of the invention, the system includes a manufacturing execution system and a plurality of manufacturing sites coupled to the manufacturing execution system. The manufacturing execution system comprises management data to support the manufacturing sites. Each manufacturing site comprises a corresponding site attribute. At least one of the manufacturing sites receives a lot, queries the management data for the lot from the manufacturing execution system according to lot identification and the site attribute of the manufacturing site receiving the lot, and processes the lot accordingly.

The management data comprises product information comprising route information indicating stages and/or equipment tools that the lot must to pass, and the manufacturing site further processes the lot accordingly. The system further includes a management interface for product information updates.

The system further includes a plurality of interfaces, each comprising a site attribute limitation corresponding to respective manufacturing site, such that a respective manufacturing site has operational authority over the management data based on the site attribute limitation.

The management data comprises user information indicating access authorities on respective manufacturing sites for related personnel, or lot information comprising identifications of lots processed on respective manufacturing sites.

According to this embodiment of the invention, a manufacturing management method is provided. First, a request is received from at least one manufacturing site by a manufacturing execution system. The request comprises lot identification of at least one lot and a site attribute of the manufacturing site. Management data for the lot is then retrieved according to the lot identification and the site attribute, and transmitted to the manufacturing site.

The management data comprises product information comprising route information indicating stages and/or equipment tools that the lot must to pass, and the lot is further processed accordingly on the manufacturing site. The product information is further updated via a management interface.

Further, management data operations are then performed by respective manufacturing sites via a plurality of interfaces respectively. Each interface comprises a site attribute limitation corresponding to respective manufacturing site, and a respective manufacturing site has operational authority over the management data based on the site attribute limitation.

The above-mentioned method may take the form of program code embodied in a tangible media. When the program code is loaded into and executed by a machine, the machine can become an apparatus for practicing the disclosed methods.

BRIEF DESCRIPTION OF THE DRAWINGS

The aforementioned features and advantages will become apparent by referring to the following detailed description with reference to the accompanying drawings, wherein.

DESCRIPTION

Figure 4:
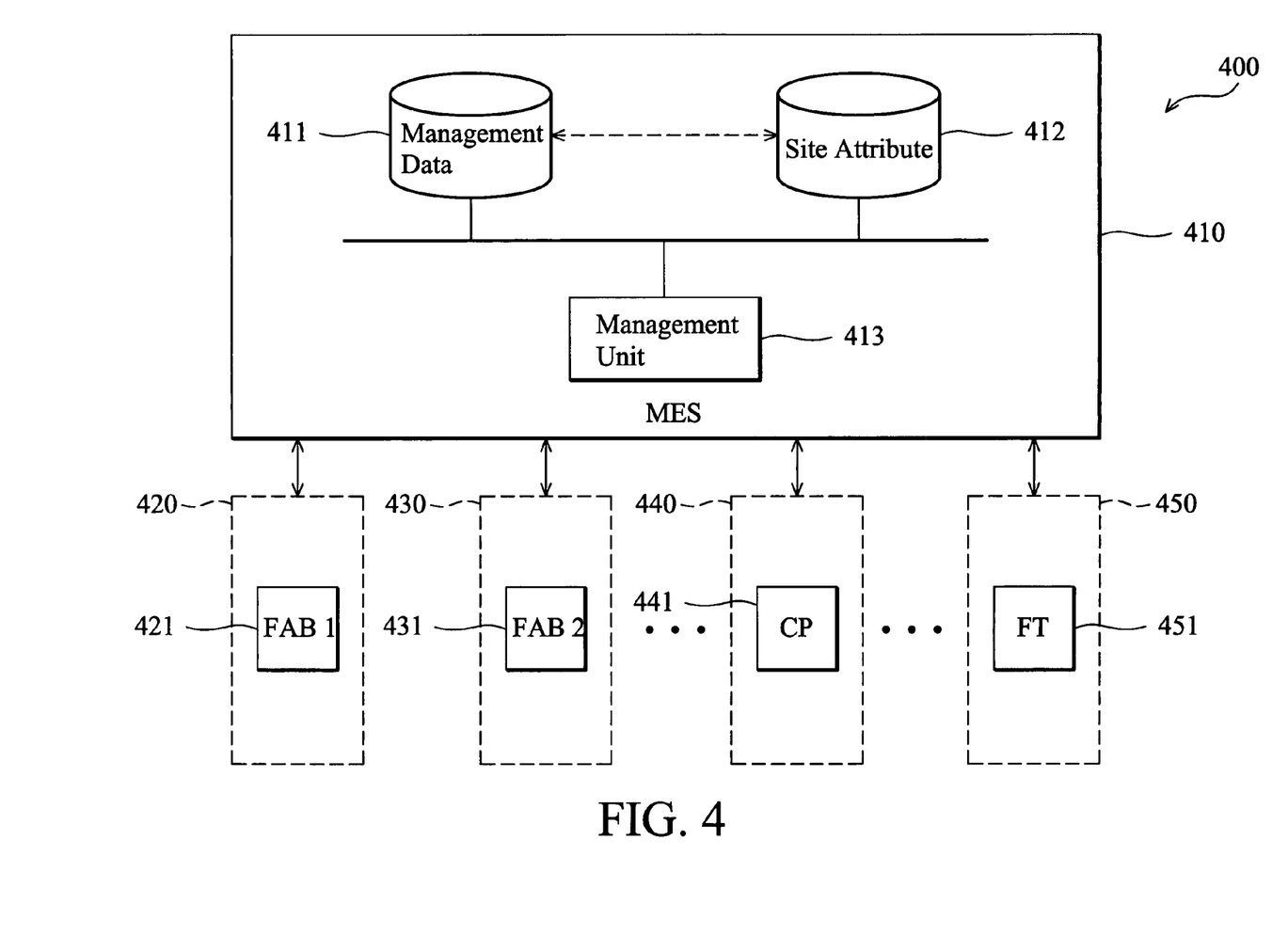
FIG. 4 is a schematic diagram illustrating the architecture of the manufacturing management system according to an embodiment of the invention.

FIG. 4 is a schematic diagram illustrating the architecture of the manufacturing management system according to an embodiment of the invention. The manufacturing management system 400 includes a MES (Manufacturing Execution System) 410 and a plurality of manufacturing phases 420, 430, 440 and 450.

Each manufacturing phase includes at least one manufacturing site. In this embodiment, the manufacturing phase 420 includes a manufacturing site FAB-1 421, the manufacturing phase 430 includes a manufacturing site FAB-2 431, the manufacturing phase 440 includes a manufacturing site CP 441, and the manufacturing phase 450 includes a manufacturing site FT 451. It is understood that the manufacturing phases and/or sites may includes FAB (Fabrication), CP (Circuit Probe), BP (Bumping), CF (Color Filter), ASM (Assembly), FT (Final Test), and others. Additionally, no manufacturing site has an individual MES controlling lot handling thereon. The lot handling comprises Lot Hold, Lot Split, Lot Merge, Lot Order Change, Lot Sub Route Branch, and others. The manufacturing sites are centrally controlled and supported by the MES 410.

The MES 410 includes management data 411, site attributes 412, and a management unit 413. The management data 411 comprises base records, such as product information, user information, and lot information. The product information comprising route information indicating stages and/or equipment tools that respective lot must to pass. The user information indicates access authorities on respective manufacturing sites for related personnel. Different users of each manufacturing site have different access authorities to the manufacturing site. The access may comprise equipment operations, lot handling, reporting, accounting, and others. The lot information comprises status and identifications of lots processed on respective manufacturing sites. The management data 411 can be provided to the manufacturing sites, and used for related lot handling thereon. The site attributes 412 identify the manufacturing sites, that is, each manufacturing site has an individual site attribute 412. The management data 411 has a logic relation with the site attributes 412. Each data set of the management data 411 has a corresponding site attribute 412, indicating that the data belongs to a specific manufacturing site. The site attributes 412 are critical to prevent interference between multiple manufacturing sites in such an environment using a single MES to support multiple manufacturing sites. The management unit 413 controls and manages related operations of the MES 410 based on the site attributes 412.

Figure 5:
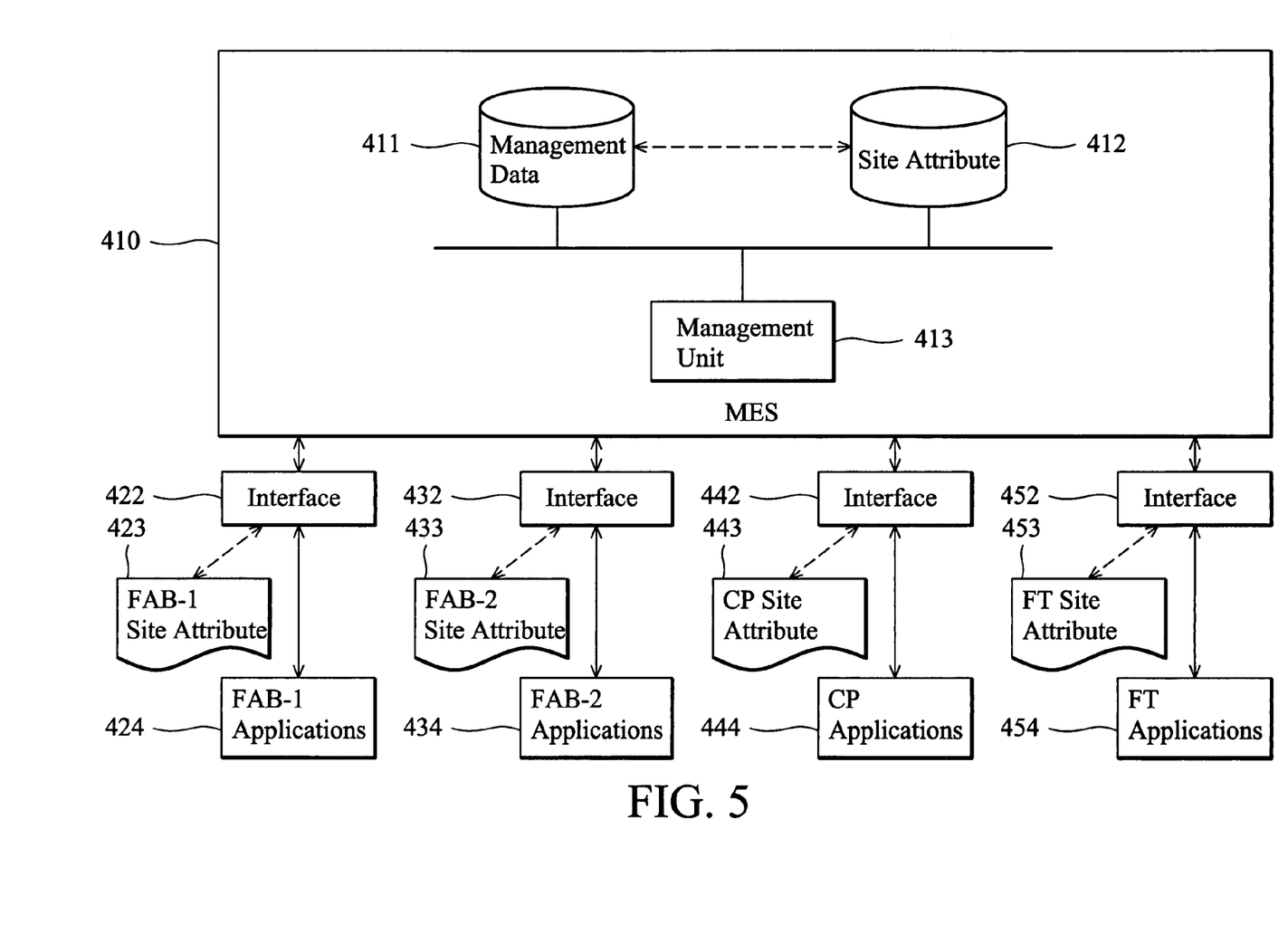
FIG. 5 is a schematic diagram illustrating the interfaces for respective manufacturing sites according to an embodiment of the invention.

Furthermore, the manufacturing management system 400 provides interfaces for respective manufacturing sites, users and/or applications thereof. Each interface is designed to limit to a specific site attribute corresponding to a specific manufacturing site. FIG. 5 is a schematic diagram illustrating the interfaces for respective manufacturing sites according to an embodiment of the invention. As shown in FIG. 5, an interface 422 is provided for FAB-1 applications 424 of the manufacturing site FAB-1 421, an interface 432 is provided for FAB-2 applications 434 of the manufacturing site FAB-2 431, an interface 442 is provided for CP applications 444 of the manufacturing site CP 441, and an interface 452 is provided for FT applications 454 of the manufacturing site FT 451. The applications may comprise lot receive/ship, customer lot report, report and accounting applications.

The interface 422 comprises a limitation of the FAB-1 site attribute 423, the interface 432 comprises a limitation of the FAB-2 site attribute 433, the interface 442 comprises a limitation of the CP site attribute 443, and the interface 452 comprises a limitation of the FT site attribute 453. Accordingly, respective applications and/or manufacturing sites have respective operation authorities to the management data based on the site attribute limitation. That is respective site users or applications can operate equipment, lots and related data in their site.

It is understood that embodiments of the present invention can be integrated with a web-based platform providing online service and displaying related information to clients. It is also understood that the interfaces can be outside or integrated into the MES 410. Additionally, the interfaces may be web-based interfaces, and related queries can be received from clients and/or in-house personnel via the interfaces. Through these interfaces, the manufacturing management system 400 with a single MES acts as multisite from a client perspective.

Figure 6:
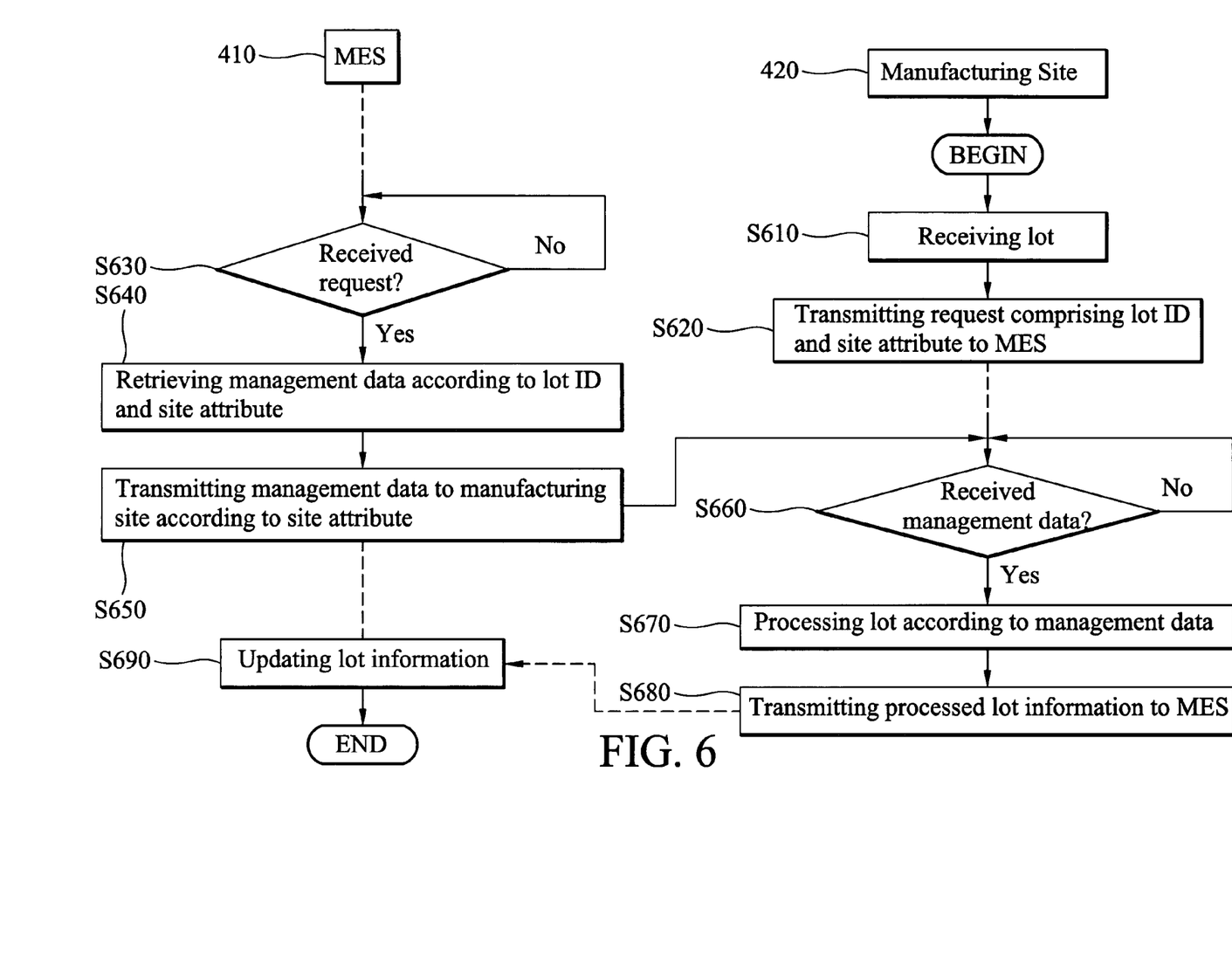
FIG. 6 is a flowchart showing the manufacturing management method according to an embodiment of the invention.

FIG. 6 is a flowchart showing the manufacturing management method according to an embodiment of the invention. It is understood that only one manufacturing site 420 is discussed in FIG. 6, the operation between the MES 410 and other manufacturing sites is similar thereto.

First, in step S610, at least one lot is received by the manufacturing site 420. Then, in step S620, the manufacturing site 420 transmits a request for management data, such as product information of the lot to the MES 410. The request comprises lot identification of the lot and a site attribute of the manufacturing site 420. The site attribute can be used to identify the manufacturing site. In step S630, the MES 410 checks whether any request is received. If a request has been received (yes in step S630), in step S640, the MES 410 retrieves management data according to the lot identification and the site attribute, and in step S650, transmits the management data to the manufacturing site 420 according to the site attribute. In step S660, the manufacturing site 420 checks whether the management data for the lot is received. If yes (yes in step S660), in step S670, the manufacturing site 420 processes the lot according to the management data, and in step S680, transmits processed lot information to the MES 410 after the lot is processed on the manufacturing site 420. Once the processed lot information is received, in step S690, the MES 410 updates the lot information of the lot.

Figure 7:
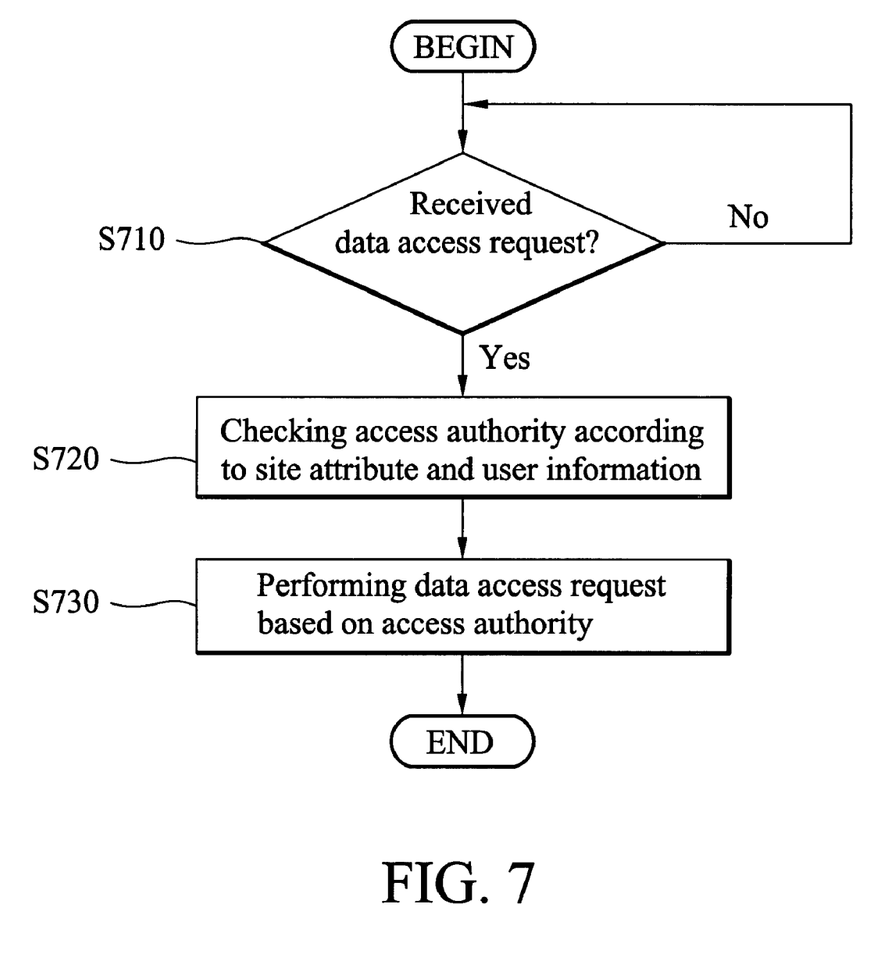
FIG. 7 is a flowchart showing the operation of data access according to an embodiment of the invention.

FIG. 7 is a flowchart showing the operation of data access according to an embodiment of the invention. First, in step S710, the MES 410 checks whether any data access request is received. It is understood that any access request from a specific manufacturing site and/or a site user must comprise a site attribute of the manufacturing site and/or user information. If not, the procedure remains at step S710. If yes, in step S720, the MES 410 checks access authority of the site user according to the site attribute and the user information, and in step S730, performs related operations for the data access request based on the access authority.

An embodiment of the invention thus provides a manufacturing management system and method that employs a single MES to support multiple manufacturing sites, thereby ensuring data consistency between manufacturing sites, and reducing cost for conventional multi-MES system and related maintenance manpower.

Embodiments of the method and system, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. The method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed embodiment. When implemented on a general-purpose processor, the program code combines with the processor to provide a unique apparatus that operates analogously to application specific logic circuits.

Although an embodiment of the present invention has been described, it is not intended to limit the invention thereto. Those skilled in this technology can still make various alterations and modifications without departing from the scope and spirit disclosed.

What is claimed is:

1. A manufacturing management system, comprising:
 a manufacturing execution system comprising management data with a corresponding site attribute, in which the management data comprises product information comprising route information indicating stages and/or equipment tools that the lot must to pass; and
 a plurality of manufacturing sites coupled to the manufacturing execution system, each comprising a corresponding site attribute, at least one of which receives a lot which has a lot identification, queries the management data for the lot from the manufacturing execution system according to the lot identification and the site attribute of the manufacturing site receiving the lot, and processes the lot according to the management data.

2. The system of claim 1 further comprising a management interface for product information update.

3. The system of claim 1 further comprising a plurality of interfaces, each comprising a site attribute limitation corresponding to a respective manufacturing site, such that the respective manufacturing site has operational authority over the management data based on the site attribute limitation.

4. The system of claim 1 wherein the management data comprises user information indicating access authorities on respective manufacturing sites for related personnel, or lot information comprising identifications of lots processed on respective manufacturing sites.

5. The system of claim 1 wherein the manufacturing sites comprise fabrication, circuit probe, bumping, color filter, assembly, or final test sites.

6. A manufacturing management method, comprising the steps of:
 reception of a lot which has a lot identification by at least one manufacturing site comprising a corresponding site attribute;
 querying management data for the lot from a manufacturing execution system according to the lot identification and the site attribute, in which the manufacturing execution system comprises management data to support a plurality of manufacturing sites; and
 processing the lot on the manufacturing site according to the management data, in which the management data comprises product information comprising route information indicating stages and/or equipment tools that the lot must to pass.

7. The method of claim 6 further comprising updating the product information via a management interface.

8. The method of claim 6 further comprising operation of the management data by respective manufacturing sites via a plurality of interfaces respectively, in which each interface comprises a site attribute limitation corresponding to respective manufacturing site, and respective manufacturing site has operational authority over the management data based on the site attribute limitation.

9. The method of claim 6 wherein the management data comprises user information indicating access authorities on respective manufacturing sites for related personnel, or lot information comprising identifications of lots processed on respective manufacturing sites.

10. The method of claim 6 wherein the manufacturing sites comprise fabrication, circuit probe, bumping, color filter, assembly, or final test sites.

11. A manufacturing management method, comprising the steps of:
 receiving a request from at least one manufacturing site, in which the request comprises lot identification of at least one lot and a site attribute of the manufacturing site;
 retrieving management data for the lot according to the lot identification and the site attribute, in which the management data comprises product information comprising route information indicating stages and/or equipment tools that the lot must to pass; and
 transmitting the management data to the manufacturing site,
 wherein the lot is processed on the manufacturing site according to the management data.

12. The method of claim 11 further comprising updating the product information via a management interface.

13. The method of claim 11 further comprising operation of the management data by respective manufacturing sites via a plurality of interfaces respectively, in which each interface comprises a site attribute limitation corresponding to respective manufacturing site, and respective manufacturing site has operational authority over the management data based on the site attribute limitation.

14. The method of claim 11 wherein the management data comprises user information indicating access authorities on respective manufacturing sites for related personnel, or lot information comprising identifications of lots processed on respective manufacturing sites.

* * * * *